(12) United States Patent
Bezeaukt et al.

(10) Patent No.: US 11,912,343 B2
(45) Date of Patent: Feb. 27, 2024

(54) OPENWORK STRUCTURAL ELEMENT FOR DASHBOARD, ASSOCIATED CROSSMEMBER AND CORRESPONDING DASHBOARD

(71) Applicant: Nissan Motor Co., Ltd., Kanagawa (JP)

(72) Inventors: Loic Bezeaukt, Le Chesnay (FR); Robin Law, Garches (FR)

(73) Assignee: Nissan Motor Co., Ltd., Kanagawa (JP)

( * ) Notice: Subject to any disclaimer, the term of this patent is extended or adjusted under 35 U.S.C. 154(b) by 344 days.

(21) Appl. No.: 17/293,630

(22) PCT Filed: Nov. 8, 2019

(86) PCT No.: PCT/EP2019/080729
§ 371 (c)(1),
(2) Date: May 13, 2021

(87) PCT Pub. No.: WO2020/099273
PCT Pub. Date: May 22, 2020

(65) Prior Publication Data
US 2023/0072338 A1    Mar. 9, 2023

(30) Foreign Application Priority Data

Nov. 15, 2018 (FR) ...................... 1860516

(51) Int. Cl.
*B62D 25/14* (2006.01)
*B62D 29/04* (2006.01)
*B60K 37/00* (2006.01)

(52) U.S. Cl.
CPC .......... *B62D 25/145* (2013.01); *B62D 29/04* (2013.01); *B60K 37/00* (2013.01); *B62D 25/14* (2013.01); *B62D 29/043* (2013.01)

(58) Field of Classification Search
CPC .... B62D 25/145; B62D 29/04; B62D 29/043; B62D 25/14
(Continued)

(56) References Cited

U.S. PATENT DOCUMENTS 5,857,726 A    1/1999   Yokoyama et al.
7,837,009 B2 *   11/2010   Gross ..................... D06M 11/82
                                                                                   181/290
(Continued)

FOREIGN PATENT DOCUMENTS

DE    102006040624 A1    5/2007
JP      H9-249048 A      9/1997
(Continued)

*Primary Examiner* — Amy R Weisberg
*Assistant Examiner* — Dana D Ivey
(74) *Attorney, Agent, or Firm* — Osha Bergman Watanabe & Burton LLP

(57) ABSTRACT

A structural element forms a motor vehicle dashboard body that is intended to be installed in a transverse installation position inside a vehicle passenger compartment. The structural element has a one-piece openwork structure produced by three-dimensional printing. The openwork structure defines: a first internal passage that passes all the way through the structural element and extends transversely when the structural element is in the installation position. The first passage is shaped so as to receive a crossmember that is in particular bent with a constant radius of curvature and having at least two fastening elements that are intended to be fastened to the crossmember. A second internal passage connects the first passage to a face of the structural element that is directed toward the rear of the vehicle when the structural element is in the installation position. The second passage has at least one fastening element that is intended to fasten a steering column fastening support.

11 Claims, 3 Drawing Sheets

(58) Field of Classification Search
USPC .................................................. 296/193.02
See application file for complete search history.

(56) References Cited

U.S. PATENT DOCUMENTS

| | | | | |
|---|---|---|---|---|
| 7,946,640 B2* | 5/2011 | Sato | ................. | B29C 45/14778 |
| | | | | 296/72 |
| 7,963,315 B2* | 6/2011 | Ishikawa | ............ | B60H 1/00535 |
| | | | | 296/187.05 |
| 2004/0108744 A1* | 6/2004 | Scheib | ................. | B62D 25/142 |
| | | | | 296/70 |
| 2009/0174214 A1 | 7/2009 | Sato | | |

FOREIGN PATENT DOCUMENTS

| | | | |
|---|---|---|---|
| JP | 2007-161131 A | 6/2007 | |
| JP | 2018-507818 A | 3/2018 | |

\* cited by examiner

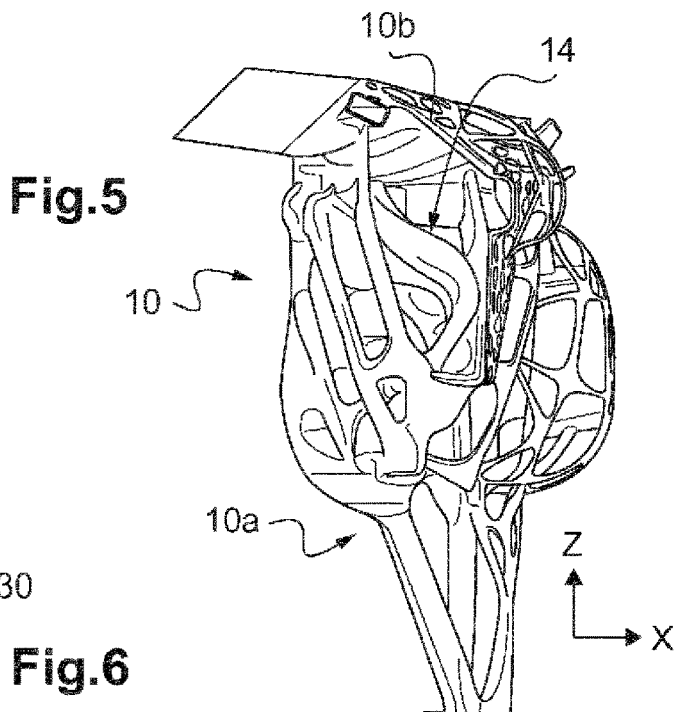
Fig.5
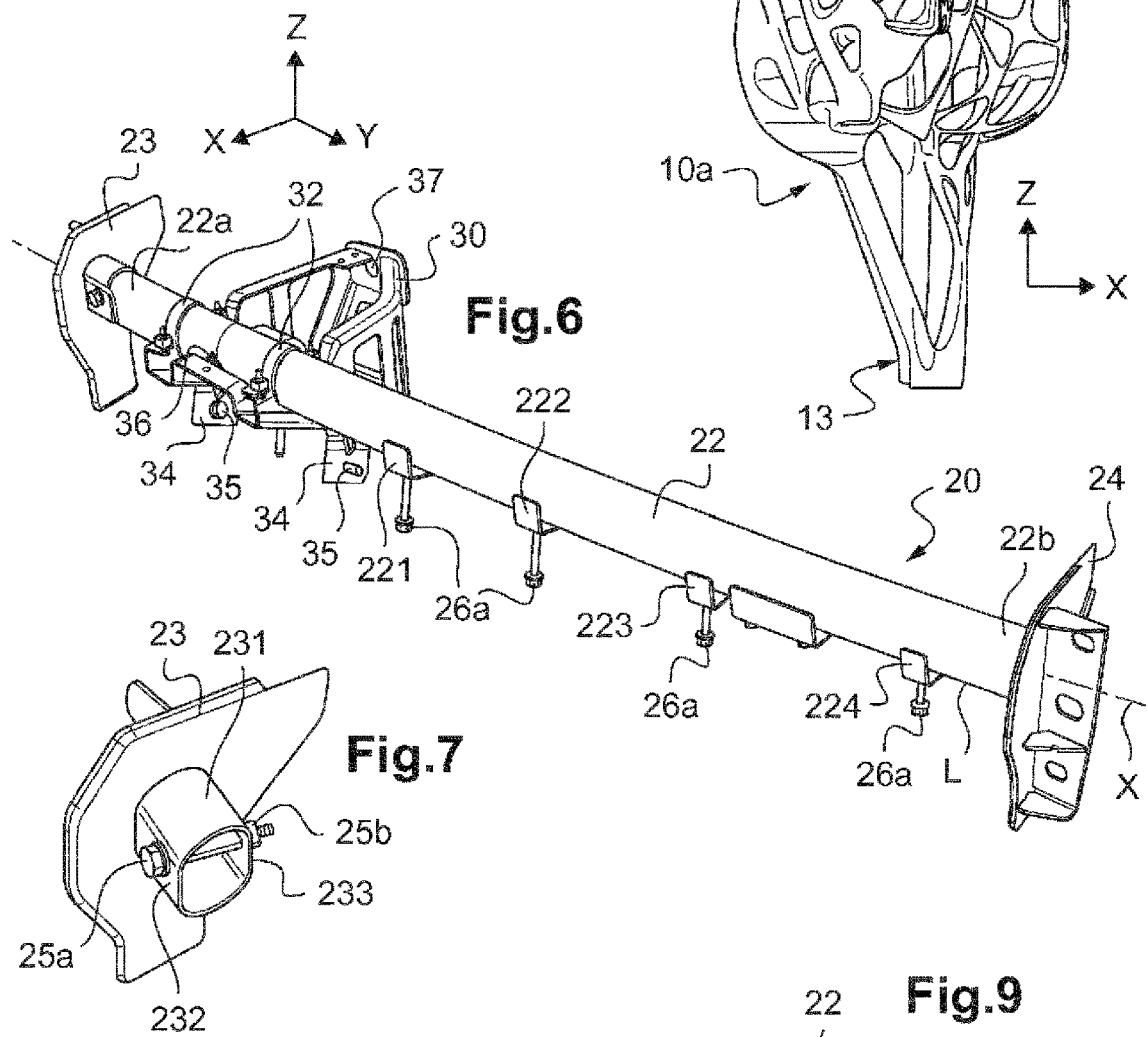
Fig.6
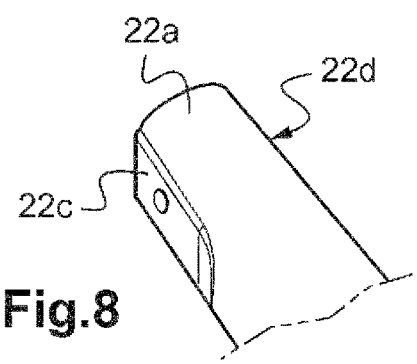
Fig.7
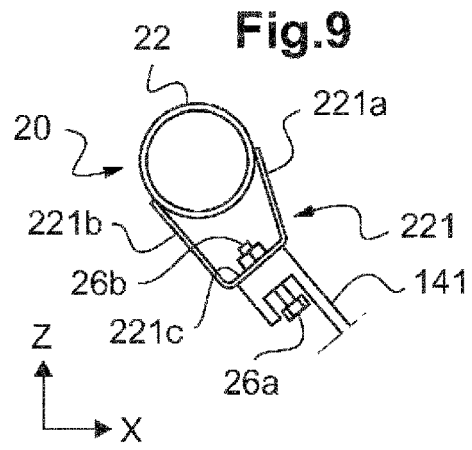
Fig.8
Fig.9

OPENWORK STRUCTURAL ELEMENT FOR DASHBOARD, ASSOCIATED CROSSMEMBER AND CORRESPONDING DASHBOARD

The invention relates to a structural element with an openwork structure that forms a dashboard body. It also relates to a crossmember that is shaped so as to be introduced into the structural element and fastened thereto, and to a dashboard comprising the structural element and the crossmember.

In the field of motor vehicles, dashboards are installed transversely in the passenger compartment, in front of the seats for the driver and the front passenger. The dashboard body constitutes the framework of the dashboard. It is covered with a trim or skin that forms the external wall of the dashboard. This dashboard body in particular supports various items of equipment such as the instrument panel, the driving indicators, and various control means, for example for controlling the air-conditioning, car radio and navigation equipment.

Usually, a dashboard body is composed of a large number of elements that are joined together. These are generally components made of polymer or composite material that are obtained by molding and then joined together by heading, screwing, etc. Assembling a dashboard body is therefore relatively complex and the assembly is relatively heavy.

The invention aims to remedy these drawbacks by proposing a dashboard body that is produced in one piece, in particular by an additive manufacturing process known as "three-dimensional printing", also called "3D printing".

To this end, the subject of the invention relates to a structural element forming a motor vehicle dashboard body that is intended to be installed in a transverse installation position inside a vehicle passenger compartment. According to the invention, the structural element has a one-piece openwork structure produced by three-dimensional printing, and the openwork structure defines:
- a first internal passage that passes all the way through the structural element and extends transversely when the structural element is in the installation position, the first passage being shaped so as to receive a crossmember that is in particular bent with a constant radius of curvature and having at least two fastening elements that are intended to be fastened to the crossmember,
- a second internal passage that connects the first passage to a face of the structural element that is directed toward the rear of the vehicle when the structural element is in the installation position, the second internal passage having at least one fastening element, preferably at least two fastening elements, that is/are intended to fasten a steering column fastening support.

An "openwork structure" is understood to be a structure having cells, perforations and/or cavities that are intended to limit the amount of material. The amount of material used can correspond to a minimum amount of material necessary for the mechanical integrity of the structure for the envisaged use. This amount of material can be determined by calculation of the forces that the structure has to withstand, for example to support itself under its own weight, to withstand a force distributed over the surface, for fastening it to the bodyshell of the vehicle, for the incorporation of auxiliary elements (fastening interfaces, incorporation of the HVAC (heating, ventilation and air-conditioning) unit, incorporation of the elements of the storage volumes, etc.).

The openwork structure of the structural element according to the invention is thus in the form of a network of material forming meshes and nodes. Such a network can be formed by parts that resemble hollow vessels, semi-solid vessels (internal structure also called a lattice) or solid interconnected vessels.

The fastening elements of the structural element for fastening the crossmember can be positioned so as to be fastened to an upper or lower region of the crossmember, in the installation position of the structural element. Fastening to a lower region of the crossmember can improve the holding of the crossmember, however.

The second passage receives the steering column fastening support on which the steering wheel of the vehicle will be mounted. Consequently, it is situated facing the driver, in the installation position of the structural element.

Thus, the second passage can be connected to the first passage in the vicinity of one end of the first passage, and the fastening elements of the first passage are then situated between the second passage and the other end of the first passage. This can make it easier to introduce the crossmember into the first passage.

The structural element may have an internal framework with an openwork structure that is in one piece with an external skin at least partially delimiting a volume of the structural element, said external skin having an external surface chosen from an openwork surface, a solid surface and a surface that has one or more openwork and solid regions. In particular, this external skin can correspond to a visible part of the inside of the passenger compartment when the structural element is in the installation position. The second passage then opens onto a face of the structural element that is provided with this external skin.

The structural element according to the invention is preferably obtained by three-dimensional printing, for example by fused filament deposition (fused deposition modeling or fused filament fabrication) or by selective laser sintering. To this end, any material that can be printed using this technique can be used.

Advantageously, the material may be a polymer material chosen from acrylonitrile butadiene styrene (ABS), polypropylene (PP) and polylactic acid (PLA). The polymer material can also be filled with particles of glass or carbon.

The invention also relates to a dashboard crossmember that is able to be inserted into a structural element according to the invention. The crossmember includes a bent tube, preferably hollow, having a constant radius of curvature. The crossmember can thus be produced very simply; in particular, the tube can be in one piece and/or have a constant section along substantially its entire length. Furthermore, the section of the tube can have a simple geometric shape, for example a circular shape, although other shapes are conceivable (a section that is oval, elongate, square, rectangular, etc.).

The tube can be made of metal, for example steel.

In one embodiment, the crossmember may comprise at least two fastening elements secured to the tube and intended to fasten it to the structural element.

The fastening elements can then extend along a single longitudinal line on the surface of the tube, parallel to a central axis of the tube. This can make it easier to introduce the crossmember into the first passage of the structural element.

These fastening elements can be U-shaped tabs that are secured to the crossmember, for example by welding, such that the crossmember closes their concavity. They can thus be produced simply and their fastening is robust. Furthermore, this configuration allows a nut to be fastened (in particular by welding) to the bottom of the U-shaped part, inside the concavity of the tab, allowing a screw to be fastened that passes through an orifice situated at the center of the nut.

In one embodiment, the tube of the crossmember is equipped with a flange at each of its ends, at least one of the flanges being joined to the tube in a removable manner. The crossmember can thus be introduced into the structural element via an end that does not have a flange, and this makes it easier to introduce it into the first passage of the structural element but also allows the internal dimensions of the first passage to be reduced.

This removable fastening can be realized by a sleeve that is secured to the flange and fits over one end of the tube. Advantageously, the sleeve can have at least one flat that cooperates with a flat on the end of the tube. This allows the sleeve, and therefore the flange, to be positioned precisely relative to the tube, and this can make it easier to mount the flange on the bodyshell of the vehicle. The presence of a flat also makes it possible to prevent any rotation of the sleeve relative to the tube when the latter has a circular section.

The invention also relates to motor vehicle dashboard intended to be mounted inside a vehicle in a transverse direction thereof.

According to the invention, the dashboard comprises:
a crossmember comprising a bent tube with a constant radius of curvature,
a steering column fastening support having at least one element for fastening to the crossmember,
a one-piece openwork structural element forming a dashboard body, in particular produced by three-dimensional printing, the structural element defining:
a first internal passage that passes all the way through the structural element and extends transversely to the vehicle when the dashboard is mounted inside the vehicle, the first passage being shaped so as to receive the crossmember and having at least two elements for fastening to the crossmember,
a second internal passage that connects the first passage to a face of the structural element that is directed toward the rear of the vehicle when the dashboard is mounted inside the vehicle, the second passage having at least one element, preferably at least two elements, for fastening to the steering column fastening support.

Furthermore, the steering column fastening support is fastened to the structural element inside the second passage, and the crossmember is fastened to the structural element inside the first passage and is fastened to the steering column fastening support.

The assembly thus obtained has a limited number of components and fastenings, thereby allowing its weight to be reduced and its mounting to be simplified.

In particular, the structural element and/or the crossmember can be as described above.

In particular, the tube of the crossmember can be equipped with a flange at each of its ends, at least one of the flanges being joined to the tube in a removable manner. This joining-together can be realized by a sleeve that fits over one end of the tube as described above.

The structural element can be shaped so as to receive the steering column fastening support beneath the crossmember when the dashboard is mounted inside the vehicle. In particular, the steering column fastening support can be situated partially in front of the crossmember in the installation position of the structural element.

The steering column fastening support can also include a part for receiving the crossmember, for example with a shape complementary to the crossmember. This can make it easier to introduce the crossmember, since the receiving part is able to guide the sliding of the crossmember, and can also improve the holding of the crossmember, in particular when the fastening support for the steering column is beneath the crossmember.

A further subject of the invention is a motor vehicle comprising a structural bodyshell and a dashboard that has all or some of the above features, the dashboard being fastened to the bodyshell via at least four fastening regions that are located:
on each of the two end flanges of the crossmember,
at the rear of the column fastening support,
in a bottom region of the structural element.

Finally, the invention relates to a method for mounting a dashboard according to the invention, comprising:
introducing the steering column fastening support into the second passage and fastening it to the openwork structural element,
introducing the crossmember into the first passage by sliding via one of the ends of the first passage, the crossmember being introduced by an end that does not have a flange, if need be,
fastening the crossmember to the steering column fastening support and to the openwork structural element,
optionally, mounting the flange at the end of the crossmember by which the crossmember was introduced into the structural element and fastening the flange to the crossmember by welding or by means of a screw, rivet or the like.

The assembly can thus be mounted quickly and easily.

The steering column fastening support can be fastened beneath the crossmember, and this can promote the holding thereof. It can be partially in front of the crossmember relative to the longitudinal direction of the vehicle.

As a variant or in combination, the concavity of the crossmember can be directed toward the front of the vehicle when the dashboard is mounted inside the latter. This allows the crossmember to be moved as far toward the rear of the vehicle as possible, in particular at the point where it is fastened to the steering column support. Such a close-together position of the crossmember and of the steering column support can make it possible to limit the vibrations that will be transmitted to the steering wheel.

In all cases, the crossmember can also extend in a substantially horizontal, or horizontal, plane. Such a position close to horizontal also allows the distance separating the steering column support and the crossmember to be reduced.

The invention will now be described with reference to the appended nonlimiting drawings, in which:

FIG. 5 is a side view of the structural element shown in FIG. 1;

FIG. 6 is a perspective view of a crossmember according to one embodiment of the invention, fastened to a steering column fastening support;

FIG. 7 shows one of the flanges of the crossmember shown in FIG. 6;

FIG. 8 shows the end of the crossmember cooperating with the flange in FIG. 7;

FIG. 9 shows a view in cross section of the crossmember at a point for fastening to the structural element.

In the present description, the terms front, rear, upper and lower refer to the front, rear, top and bottom directions of the vehicle when the dashboard, including the structural element and the crossmember, is mounted on the vehicle. The axes X, Y and Z correspond respectively to the longitudinal (from front to rear), transverse and vertical axes of the vehicle.

Substantially horizontal, longitudinal or vertical is understood to mean a direction/plane forming an angle of at most ±20°, or even at most 10° or at most 5°, with a horizontal, longitudinal or vertical direction/plane.

Substantially parallel, perpendicular or at right angles is understood to mean a direction/angle deviating by at most ±20°, or even at most 10° or at most 5°, from a parallel or perpendicular direction or from a right angle.

Figure 1:
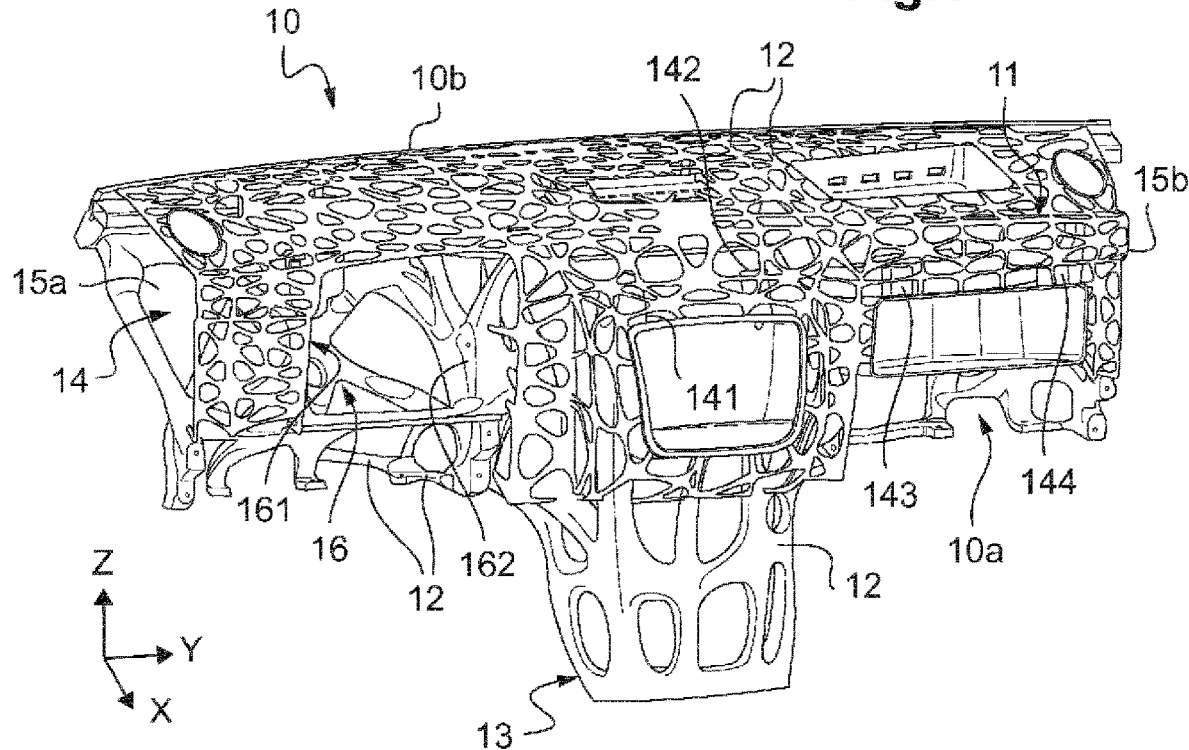
FIG. 1 is a perspective view of an openwork structural element according to one embodiment of the invention.

FIG. 1 shows a structural element 10 forming a motor vehicle dashboard body. This structural element 10 is intended to be installed in a transverse installation position (along the Y axis) inside a vehicle passenger compartment.

According to the invention, this structural element 10 has a one-piece openwork structure, in this case produced by three-dimensional printing (also called "3D printing").

As can be seen in FIG. 1 (and in FIGS. 2 to 5), a network of interconnected parts that resemble vessels 12 is thus distinguished. The thickness and the shape of each of these vessels 12 can be chosen so as to obtain a structure that can be used for the desired use, for example fulfilling conditions of mechanical integrity, stiffness or the like. Similarly, the interconnection regions of these vessels 12 can have various shapes and various dimensions. Finally, these vessels can be hollow or solid. It will also be noted that hollow vessels can include an internal structure that forms a network (structure in the form of a lattice or with a cellular form) that allows the structure of the vessel to be reinforced while limiting the amount of material used.

According to the invention, the openwork structure 10 defines:

- a first internal passage 14 (see FIGS. 1 and 5) that passes all the way through the structural element 10 and extends transversely when the structural element 10 is in the installation position,
- a second internal passage 16 that connects the first passage 14 to a face 11b of the structural element 10 that is directed toward the rear of the vehicle when the structural element 10 is in the installation position.

The second passage 16 is in this case connected to the first passage 14 in the vicinity of one end 15a of the first passage 14. The position of the second passage 16 corresponds to the position of the driver in the vehicle. This second passage 16 is in this case substantially perpendicular to the first passage 14.

The first passage 14 also has at least two fastening elements that are intended for fastening a crossmember 20. In the example, four fastening elements 141, 142, 143, 144 are provided. The invention is not limited by the number of fastening elements, however. Only two or three fastening elements could be provided, or a number of fastenings greater than four.

In the example, the four fastening elements 141, 142, 143, 144 are disposed between the second passage 16 and the other end 15b of the first passage (see FIG. 1). As shown in FIG. 9, they are, for example, in the form of an L-shaped tab with a screw 26a passing through it that comes to engage with a fastening element 221 of the crossmember 20 and a nut 26b. Other types of fastening elements could be provided, however, for example collars 32 similar to those used to fasten the crossmember 20 to the steering column fastening support 30.

The first passage 14 is also shaped so as to receive the crossmember 20, which is bent with a constant radius of curvature, as described in greater detail with reference to FIGS. 6 to 9.

The second passage 16 has at least one fastening element that is intended to fasten a fastening support 30 for a steering column. In the example, two fastening elements 161 and 162 are provided on either side of the second passage 16. These are two opposing flat surfaces, situated on each side of the second passage 16 in the transverse direction Y, each pierced by an orifice for a screw, a rivet or the like to pass through. Here again, the number of fastening elements, or their shape, is not limited.

In the example shown, the structural element 10 has an internal framework 10a with an openwork structure that is made in one piece with an external skin 10b partially delimiting a volume of the structural element 10.

In this example, the external skin 10b corresponds substantially to the face of the structural element 10 that can be seen from inside the passenger compartment when it is mounted inside the vehicle. It also has an upper face 11a, situated beneath the windshield, and a frontal face 11b, situated facing the driver and the front passenger, directed toward the rear of the vehicle (see FIG. 2). It will be noted that the second passage 16 opens onto the frontal face 11b.

In the example, the external skin 10b itself has an openwork structure. Thus, it has an external surface 11 having openwork and solid regions, thus resembling a fabric or a network with wide meshes. It will also be noted that the internal framework 10a has vessels 12 that are thicker as a whole than those that constitute the external skin 10b.

Such a perforated external skin 10b may thus optionally be covered with a continuous (solid) technical surface, not shown, for example a textile or the like.

As a variant, this external skin 10b could have a solid external surface or a surface that has one or more openwork and solid regions (not shown).

Figure 4:
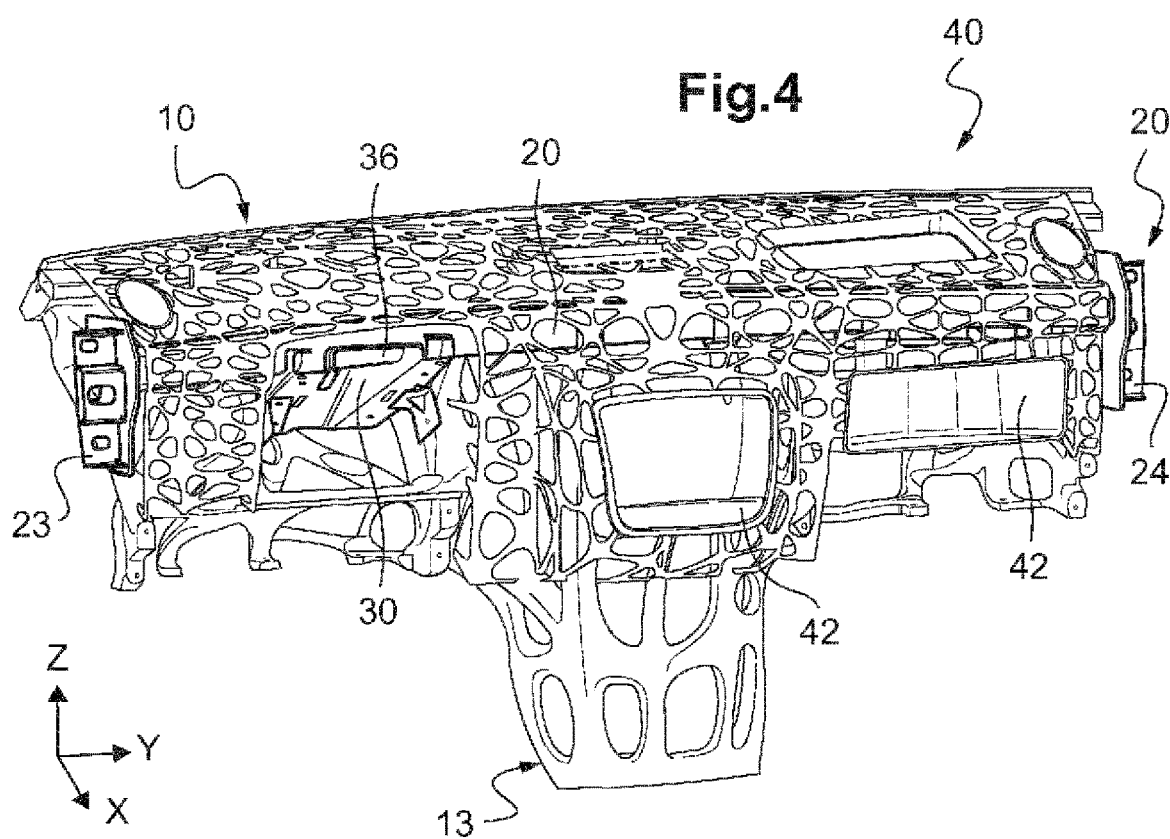
FIG. 4 is a view similar to FIG. 3, in which the crossmember is provided with its two flanges.

FIG. 4 shows a dashboard 40 having in particular the structural element 10, the crossmember 20 and the steering column fastening support 30.

The crossmember 20 is described with reference to FIGS. 6 to 9. It includes a bent tube 22 with a constant radius of curvature, preferably made in one piece. This tube 22 is preferably hollow, thereby allowing a saving in material, and is advantageously made of a strong material, such as a metal, for example steel. In the example, it has a constant circular section along substantially its entire length, namely along its entire length except for its ends 22a and 22b. For example, when steel is used, the tube can have a thickness of 1.5 mm and a diameter of 50 mm.

The bending radius may be chosen so as to bring the crossmember 20 as close as possible to the final position of the steering wheel, the crossmember being mounted in the structural element 10 in a substantially horizontal plane, with its concavity directed toward the front of the vehicle. By way of example, a bending radius of around 2500 mm can be used.

According to the embodiments, the tube 22 can also have at least two fastening elements for fastening it to the structural element 10. In this case, four fastening elements 221, 222, 223, 224 are provided. They extend preferably along a single longitudinal line L at the surface of the tube, parallel to a central axis X of the tube 22, in order to make it easier to introduce the crossmember 20 into the first passage 14.

In the embodiment shown, the four fastening elements are identical. They are in the form of U-shaped tabs as shown in FIG. 9. In this figure, the fastening element 221 includes two wings 221a and 221b which are connected by a bottom 221c and the free edges of which are secured to the tube 22, for example by welding. The tube 22 thus closes the concavity of the fastening element 221. The bottom 221c can be fastened to the fastening element 141 of the structural element 10 by means of a screw-nut assembly 26a, 26b, the screw 26a passing through the bottom and the fastening element 141, as shown. The nut 26b can in particular be fastened to the bottom 221c, inside the concavity, so as to make it easier to fasten the screw.

In the example shown, the tube 22 is equipped with a flange 23, 24 at each of its ends 22a, 22b. These flanges 23, 24 are intended for fastening the crossmember 20 to the bodyshell of the vehicle. In general, a crossmember is fastened to the front hinge pillars of the bodyshell of a vehicle.

In the example shown, one of the flanges 23 is joined to the tube 22 by a sleeve 231 that fits over the end 22a of the tube. This sleeve 231 is provided with two parallel flats 232 and 233 that cooperate respectively with corresponding flats 22c and 22d on the end 22a. The tube thus cannot pivot inside the sleeve, and the flange 23 is positioned correctly relative to the tube. The flange 23 is fastened to the tube 22 by a screw-nut assembly 25a, 25b that passes through corresponding orifices in the sleeve 231 and the end 22a. In order to make mounting easier, the nut 25b can be welded to the sleeve 231, as shown. The other flange 24 is fastened permanently to the tube 22, in this case by welding. It could nevertheless also be secured to the tube 22 by a sleeve.

The structure of the flange 23 allows it to be fastened to the tube after the tube 22 has been introduced into the structural element. It should be noted that the flange could be fastened permanently to the tube 22 after the latter has been introduced into the structural element, for example by welding or the like.

As a variant, the sleeve 231 could be fitted into the tube 22. Other fastenings could also be envisaged.

Finally, the dashboard 40 includes a steering column fastening support 30, intended to support the steering wheel.

This fastening support 30 includes at least one element 32 for fastening to the crossmember 20. In the example, two fastening elements 32 are provided, as can be seen more specifically in FIG. 6. These fastening elements 32 are in this case collars that grip the tube 22 of the crossmember 20 around its entire periphery.

The fastening support 30 also includes two elements 34 for fastening to the structural element 10. These fastening elements are in this case in the form of L-shaped tabs that are pressed against the flat surfaces 161, 162 of the structural element 10 so as to be fastened thereto by means of screws 35 (FIG. 6). It should be noted that a single fastening point could optionally be envisaged depending on the shape of the structural element.

In the example, the fastening support 30 is fastened beneath the first passage 14 so as to be fastened to the crossmember 20 at a lower face thereof. The fastening support 30 can then have a part 36 for receiving the crossmember that is able to support the latter but also guide it when it is introduced into the first passage 14.

At the rear of the fastening support 30, at least one fastening 37 is present in order to fasten the latter to the rear face of the structure 10 and to the inner face of the front bulkhead of the vehicle (not shown). This fastening is realized for example by means of a screw-nut system that passes through an orifice in the fastening support 30.

The assembly is thus fastened to the bodyshell in four fastening regions connected to the flanges 23 and 24, to the rear of the fastening support 30, by fastenings 37, and to the bottom of the structure.

The manner of mounting as a whole resembles in principle that of a dashboard of the prior art.

The mounting of the dashboard 40 will now be described with reference to FIGS. 1 to 4.

Figure 2:
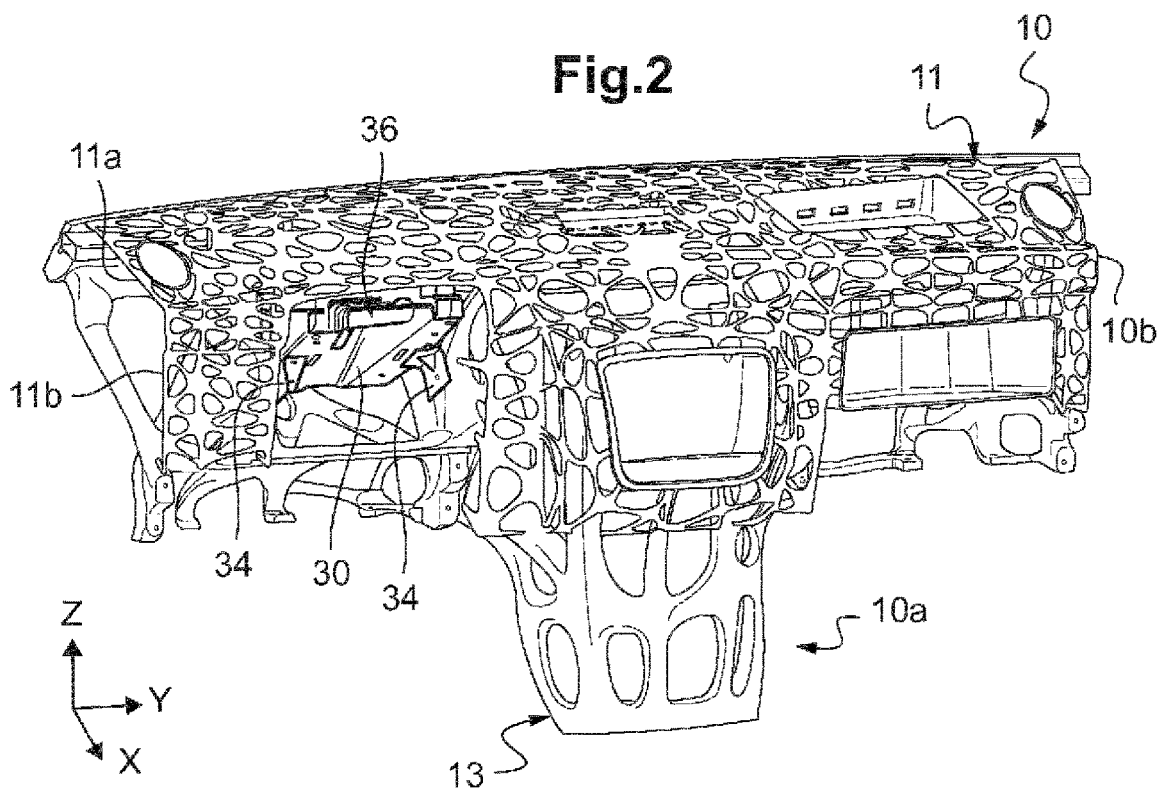
FIG. 2 is a perspective view of the structural element in FIG. 1, to which a steering column fastening support is fastened.

The steering column fastening support 30 is first of all joined to the openwork structural element 10 inside the second passage 16. To this end, the tabs 34 are brought into contact with the surfaces 161, 162 of the structural element 10 and then fastened by means of screws 35. The fastening support 30 is then positioned, as shown in FIG. 2, beneath the first passage 14.

Figure 3:
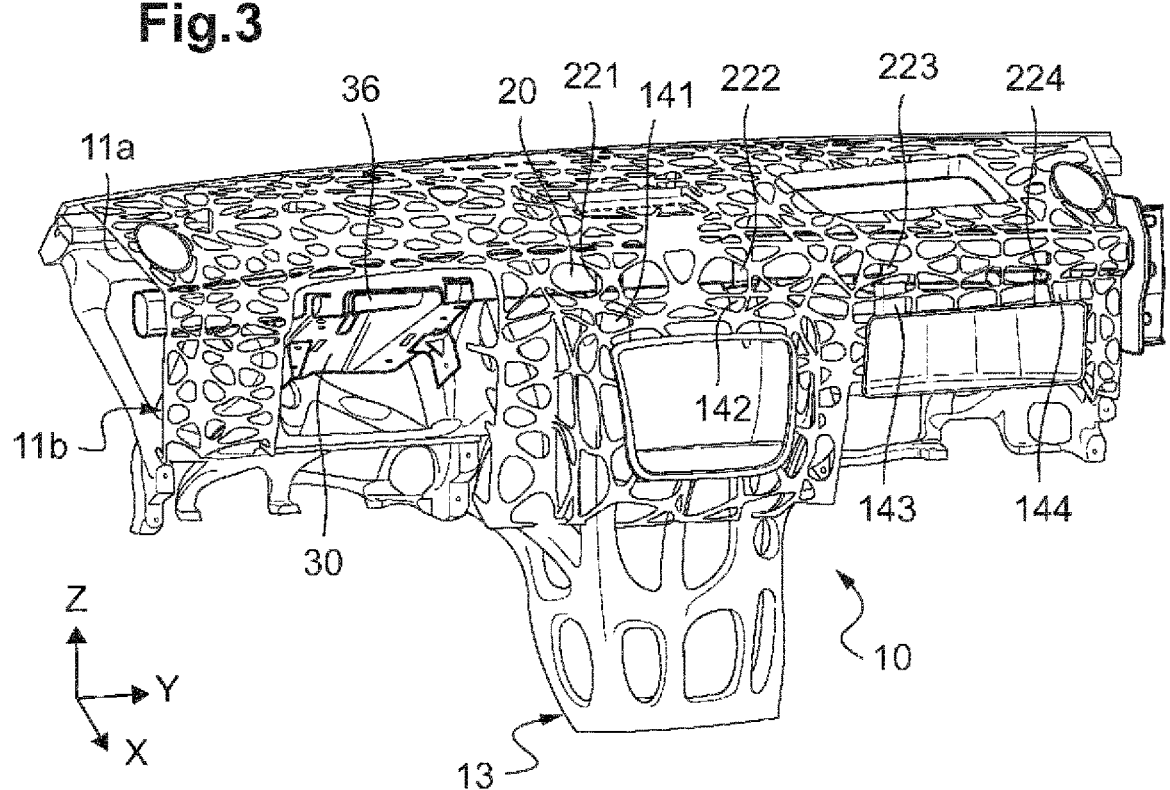
FIG. 3 is a view similar to FIG. 2, in which a crossmember according to one embodiment of the invention has been fitted inside the structural element.

The crossmember 20 is then introduced into the first passage 14 through the end 15b thereof. To this end, the flange 23 is not yet fastened to the end 22a of the tube 22 that is introduced into the structural element 10 first. Since the fastening elements 221-224 of the crossmember are fastened to the crossmember so as to be disposed between the second passage and the end 15b of the structural element, they do not impede the passage of the crossmember at the fastening support 30 for the steering column. The crossmember is introduced by sliding as far as a position in which the fastening elements 221-224 of the crossmember 20 are in contact with the corresponding fastening elements 141-144 of the structural element. Furthermore, a part of the tube 22 rests on the receiving part 36 of the steering column fastening support 30 (FIG. 3). As can be seen in FIG. 5, the first passage 14 has internal dimensions that are larger than the section of the crossmember. However, it may be conceivable to create a first passage 14 with smaller dimensions, which defines a housing for the crossmember: the crossmember would then slide inside the housing in contact with walls of the housing.

The crossmember 20 is then fastened to the steering column fastening support 30 by means of the fastening elements 32, and is fastened to the structural element 10 by means of the fastening elements 221-224.

The flange 23 can then be mounted at the end 22a of the crossmember 20, either permanently, for example by welding, or in a removable manner, for example by means of the screw-nut assembly 25a, 25b (FIG. 4).

A bottom part 13 of the structure 10 (FIG. 1) is fastened to the lower part of the bodyshell known as the central floor pan (not shown). This connection to the central floor pan is composed of a fastening or a plurality of fastenings of the screw-nut type.

The method of mounting the dashboard according to the invention is thus quick and easy on account of the smaller number of components. It is in particular possible to produce a structural element that weighs approximately 13 kg compared with over 23 kg for a conventional dashboard body formed from a plurality of joined-together components.

Furthermore, the shape and the arrangement of the structural element is not greatly constrained by the fastenings, the number of fastened elements being reduced.

3D printing also allows other functions to be incorporated into the dashboard body, such as enclosures 42 for storage boxes, airbag housings, aeraulic ducts, etc.

In the embodiment described and illustrated in FIGS. 6 to 9, the first passage 14 is shaped so as to receive a bent crossmember 20 having a constant radius of curvature. Without departing from the scope of the invention, in another embodiment of the invention that is not illustrated, the first passage may be substantially rectilinear and shaped so as to receive a substantially straight crossmember. In yet another embodiment of the invention that is not illustrated, the first passage may be shaped so as to receive a bent crossmember having a nonconstant radius of curvature.

The invention claimed is:

1. A structural element forming a motor vehicle dashboard body that is intended to be installed in a transverse installation position inside a vehicle passenger compartment,
   wherein the structural element has a one-piece openwork structure that is in a form of a network of material forming meshes and nodes and is produced by three-dimensional printing, and
   wherein the openwork structure defines:
      a first internal passage that passes all the way through the structural element and extends transversely when the structural element is in the installation position, the first internal passage being shaped so as to receive a crossmember and having at least two fastening elements that are intended to be fastened to the crossmember, and
      a second internal passage that connects the first internal passage to a face of the structural element that is directed toward the rear of the vehicle when the structural element is in the installation position, the second internal passage having at least one fastening element that is intended to fasten a steering column fastening support.

2. The structural element as claimed in claim 1, wherein the second internal passage is connected to the first internal passage in the vicinity of one end of the first internal passage, and in that the fastening elements of the first internal passage are situated between the second internal passage and the other end of the first internal passage.

3. The structural element as claimed in claim 1, wherein the structural element has an internal framework with an openwork structure that is in one piece with an external skin at least partially delimiting a volume of the structural element, said external skin having an external surface chosen from an openwork surface, a solid surface and a surface that has one or more openwork and solid regions.

4. The structural element as claimed in claim 1, wherein the structural element is made of a polymer material chosen from acrylonitrile butadiene styrene, polypropylene and polylactic acid.

5. A dashboard crossmember, made of metal, that is able to be inserted into a structural element as claimed in claim 1, the crossmember comprising:
   a hollow tube, and
   at least two fastening elements secured to the tube.

6. The dashboard crossmember as claimed in claim 5, wherein the tube is equipped with a flange at each of ends thereof, at least one of the flanges being joined to the tube in a removable manner.

7. The dashboard crossmember as claimed in claim 5, wherein the fastening elements extend along a single longitudinal line at the surface of the tube, parallel to a central axis of the tube.

8. A motor vehicle dashboard intended to be mounted inside a vehicle in a transverse direction thereof, the dashboard comprising:
   a crossmember comprising a tube that is equipped with a flange at each of ends thereof, at least one of the flanges being joined to the tube in a removable manner,
   a steering column fastening support having at least one element for fastening to the crossmember, and
   a one-piece openwork structural element that is in a form of a network of material forming meshes and nodes to form a dashboard body and is produced by three-dimensional printing,
   wherein the structural element defines:
      a first internal passage that passes all the way through the structural element and extends transversely to the vehicle when the dashboard is mounted inside the vehicle, the first internal passage being shaped so as to receive the crossmember and having at least two elements for fastening to the crossmember, and
      a second internal passage that connects the first internal passage to a face of the structural element that is directed toward the rear of the vehicle when the dashboard is mounted inside the vehicle, the second internal passage having at least one element for fastening to the steering column fastening support,
   wherein the steering column fastening support is fastened to the structural element inside the second internal passage, and the crossmember is fastened to the structural element inside the first internal passage and is fastened to the steering column fastening support.

9. A motor vehicle comprising a structural bodyshell and a dashboard as claimed in claim 8, wherein the dashboard is fastened to the bodyshell via at least four fastening regions that are located:
   on each of the two end flanges of the crossmember,
   at the rear of the column fastening support, and
   in a bottom region of the structural element.

10. A method for mounting a dashboard as claimed in claim 8, comprising:
   introducing the steering column fastening support into the second internal passage and fastening the steering column fastening support to the openwork structural element,
   introducing the crossmember into the first internal passage by sliding via one of the ends of the first internal passage, the crossmember being introduced by an end that does not have a flange,
   fastening the crossmember to the steering column fastening support and to the openwork structural element, and
   fastening the flange at the end of the crossmember by which the crossmember was introduced into the structural element.

11. The mounting method as claimed in claim 10, comprising at least one of the following features:
   the steering column fastening support is fastened beneath the crossmember,
   the crossmember extends in a substantially horizontal plane, and
   the concavity of the crossmember is directed toward the front of the vehicle when the dashboard is mounted inside the vehicle.

* * * * *